(12) United States Patent
Austraat et al.

(10) Patent No.: US 10,786,097 B2
(45) Date of Patent: Sep. 29, 2020

(54) WALL HANGING DEVICE

(71) Applicants: Bjorn Austraat, New York, NY (US); Tara Marie Austraat-Churik, New York, NY (US)

(72) Inventors: Bjorn Austraat, New York, NY (US); Tara Marie Austraat-Churik, New York, NY (US)

( * ) Notice: Subject to any disclaimer, the term of this patent is extended or adjusted under 35 U.S.C. 154(b) by 246 days.

(21) Appl. No.: 16/012,003

(22) Filed: Jun. 19, 2018

(65) Prior Publication Data

US 2019/0059615 A1 Feb. 28, 2019

Related U.S. Application Data

(60) Provisional application No. 62/551,844, filed on Aug. 30, 2017.

(51) Int. Cl.
| | |
|---|---|
| A47G 1/20 | (2006.01) |
| B23Q 11/00 | (2006.01) |
| B25H 7/00 | (2006.01) |
| B65F 1/00 | (2006.01) |
| B65D 25/22 | (2006.01) |
| F16M 13/02 | (2006.01) |

(52) U.S. Cl.
CPC .......... A47G 1/205 (2013.01); B23Q 11/0053 (2013.01); B23Q 11/0071 (2013.01); B25H 7/00 (2013.01); B65F 1/0013 (2013.01); B65D 25/22 (2013.01); F16M 13/02 (2013.01)

(58) Field of Classification Search
CPC . A47G 1/205; B23Q 11/0053; B23Q 11/0071
USPC ......................................................... 33/613
See application file for complete search history.

(56) References Cited

U.S. PATENT DOCUMENTS

| | | | |
|---|---|---|---|
| 4,893,776 A | 1/1990 | Floyd | |
| 5,240,287 A * | 8/1993 | Nirmel | A47G 1/205 283/101 |
| 5,471,760 A | 12/1995 | Farris | |
| 6,449,863 B1 | 9/2002 | Voorhees | |

(Continued)

FOREIGN PATENT DOCUMENTS

| | | | | |
|---|---|---|---|---|
| DE | 10162725 A1 * | 7/2003 | ......... | B23Q 11/0071 |
| DE | 10301414 A1 * | 7/2004 | ......... | B23Q 11/0053 |
| WO | WO-2011077076 A1 * | 6/2011 | ............. | A47G 1/205 |

Primary Examiner — Christopher W Fulton
(74) Attorney, Agent, or Firm — Dunlap Bennett & Ludwig, PLLC

(57) ABSTRACT

A wall hanging device for marking the location of wall mounting fasteners is provided. The wall hanging device intrinsically locates connection points along a wall that correspond with connection points along an article to be hung on the wall. The systemic device provides two opposing surfaces, each surface providing corresponding guide markings. Each surface also has adhesive elements so that the device can first be adhered to the article and then transferred to the wall by way of urging the article against the wall, thereby ensuring that one or more preselected connection points along the article, first associated with one surface's guide marking(s), are intrinsically located on the wall by way of the other surface's corresponding guide markings after pulling away the article, leaving the temporarily adhered device to the wall. The device also provides a foldable pocket for capturing debris resulting from the installation of the mounting fasteners.

8 Claims, 5 Drawing Sheets

(56) References Cited

U.S. PATENT DOCUMENTS

| | | |
|---|---|---|
| 6,997,653 B2 | 2/2006 | Styles |
| 7,185,442 B2* | 3/2007 | Grillo .................... A47G 1/205 |
| | | 33/613 |
| 7,421,796 B1* | 9/2008 | DeAngelis-Morris ....................... |
| | | A47G 1/205 |
| | | 33/1 B |
| 7,676,882 B1 | 3/2010 | Safiol |
| 8,539,691 B2 | 9/2013 | Daniel |
| 9,072,423 B1* | 7/2015 | Columbano ....... B23Q 11/0071 |
| 9,237,819 B1* | 1/2016 | Marks .................... A47G 1/205 |
| 9,250,054 B2 | 2/2016 | Chen |
| 9,578,980 B1 | 2/2017 | Freeman |
| 2002/0066200 A1* | 6/2002 | Lombardo ............... B25H 7/04 |
| | | 33/666 |
| 2002/0189119 A1 | 12/2002 | High |
| 2004/0098875 A1 | 5/2004 | Gould |
| 2004/0101673 A1* | 5/2004 | Schoppman ............... C09J 7/26 |
| | | 428/317.3 |
| 2004/0120607 A1 | 6/2004 | Goren |
| 2006/0075650 A1 | 4/2006 | Tatum |
| 2007/0023605 A1 | 2/2007 | Schlais et al. |
| 2007/0119068 A1* | 5/2007 | Horst .................... A47G 1/205 |
| | | 33/666 |
| 2009/0035077 A1 | 2/2009 | Aley |
| 2009/0224116 A1 | 9/2009 | Gallien |
| 2017/0129095 A1 | 5/2017 | Duncan |
| 2018/0065338 A1* | 3/2018 | Cowman-Eggert ....... B32B 5/18 |

\* cited by examiner

WALL HANGING DEVICE

CROSS-REFERENCE TO RELATED APPLICATION

This application claims the benefit of priority of U.S. provisional application No. 62/551,844, filed 30 Aug. 2017, the contents of which are herein incorporated by reference.

BACKGROUND OF THE INVENTION

The present invention relates to wall hangings and, more particularly, a wall hanging device for precision positioning of wall hangings, wherein the wall hanging device includes a pocket for capturing debris resulting from preparing the wall for hanging a separate article.

Hanging articles, artwork, and other items on walls and other vertical surfaces is a potentially complex process as it requires an individual to juggle taking measurements, properly locating connection points along the wall in relation to the article to be hung, drilling the holes, and cleaning up drilling debris upon completion of the drilling process.

Other devices and methods rely on external measurements and measuring devices to transfer the dimensionality of the article to be hung to the location of the desired drilling holes. Such transferring of measurements from the article to the hanging surface is error prone, wherein even small deviations can require patching and re-drilling of holes in order to re-position or re-align for another attempt. These other methods also require multiple additional external devices that may not readily be available.

As can be seen, there is a need for a device for precisely locating one or more connection points along a wall that correspond to connection points along an article to be hung on said wall, whereby the device provides a pocket for capturing debris when preparing the wall connection points for fasteners. The device is adapted so that no measurement error can occur through intrinsic guide markers for positioning the corresponding wall and article connection points along both sides of its temporary adhesive structure. For convenient disposal, the systemic device is also inherently adapted to collect debris generated during the process of preparing for or mounting a fastener to the wall. Thereby providing all-in-one convenience to solve the positioning, temporary marking and debris-catching shortcomings of other devices.

SUMMARY OF THE INVENTION

In one aspect of the present invention, a wall hanging device includes a planar body having a first surface and an opposing second surface; at least one first guide marking disposed along the first surface; a second guide marking for each first guide marking, each second guide marking disposed along the second surface so as to correspond to each first guide marking, respectively; a first adhesive element provided along the first surface adjacent to said at least one first guide marking; and a second adhesive element provided along the second surface adjacent to said at least one second guide marking.

In another aspect of the present invention, the wall hanging device including a planar body having a first surface and an opposing second surface; at least one first guide marking disposed along the first surface; a second guide marking for each first guide marking, each second guide marking disposed along the second surface so as to correspond to each first guide marking, respectively; a first adhesive element provided along the first surface adjacent to said at least one first guide marking; a second adhesive element provided along the second surface adjacent to said at least one second guide marking; and a debris pouch along a lower portion of the first surface, wherein the debris pouch is movable between a collecting condition and a storage condition collapsed against the first surface.

In yet another aspect of the present invention, a method of hanging an article to a supporting surface includes providing the above-mentioned wall hanging device; engaging the article to the second adhesive element so that the at least one guide marking aligns with one or more respective connectional points provided along the article; engaging the first adhesive element to the supporting surface so the article is disposed at a predetermined orientation relative to the supporting surface; disengaging the article from the second adhesive element; and marking the supporting surface at each guide marking.

These and other features, aspects and advantages of the present invention will become better understood with reference to the following drawings, description and claims.

DETAILED DESCRIPTION OF THE INVENTION

Figure 1:
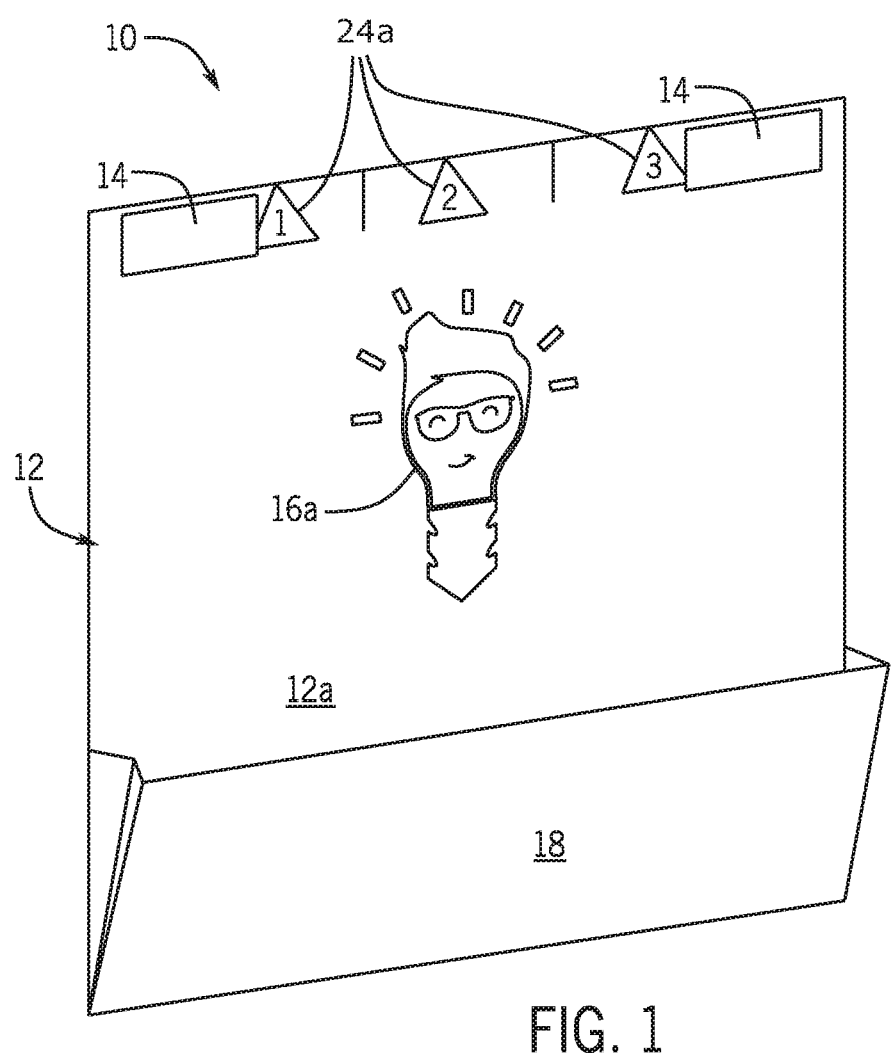
FIG. 1 is a front perspective view of an exemplary embodiment of the present invention.
Figure 2:
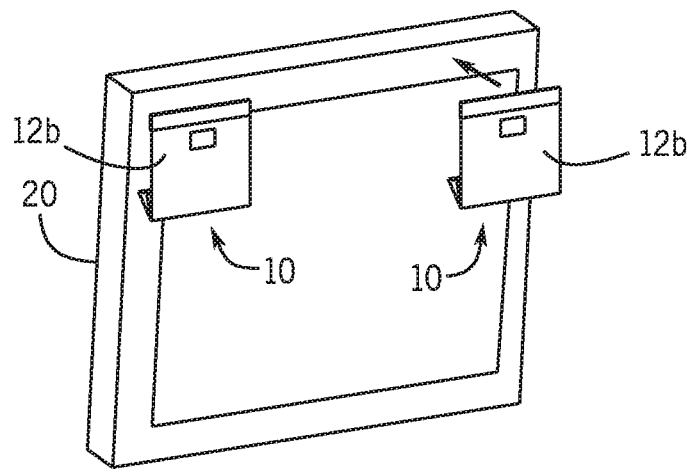
FIG. 2 is a rear perspective view of an exemplary embodiment of the present invention, shown in use.
Figure 3:
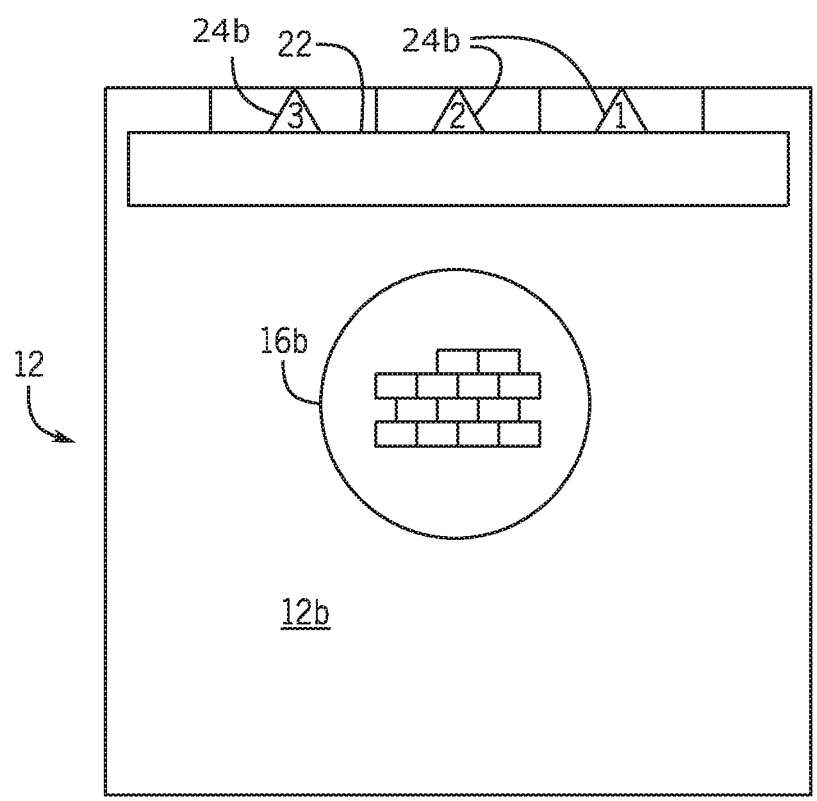
FIG. 3 is a rear elevational view of an exemplary embodiment of the present invention.
Figure 4:
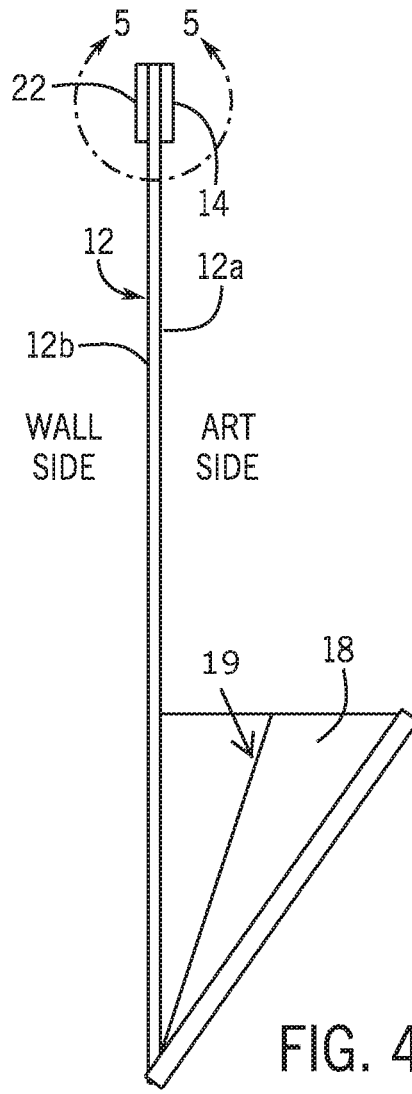
FIG. 4 is a side elevational view of an exemplary embodiment of the present invention.
Figure 5:
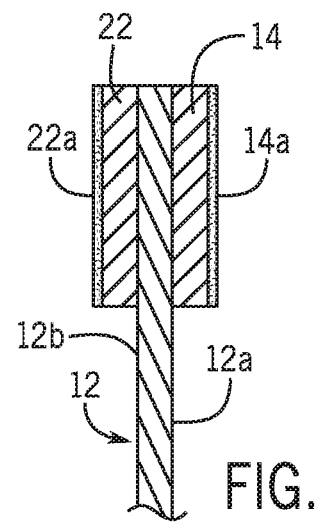
FIG. 5 is a detail cross-sectional view of an exemplary embodiment of the present invention, taken along line 5-5 of FIG. 4
Figure 6:
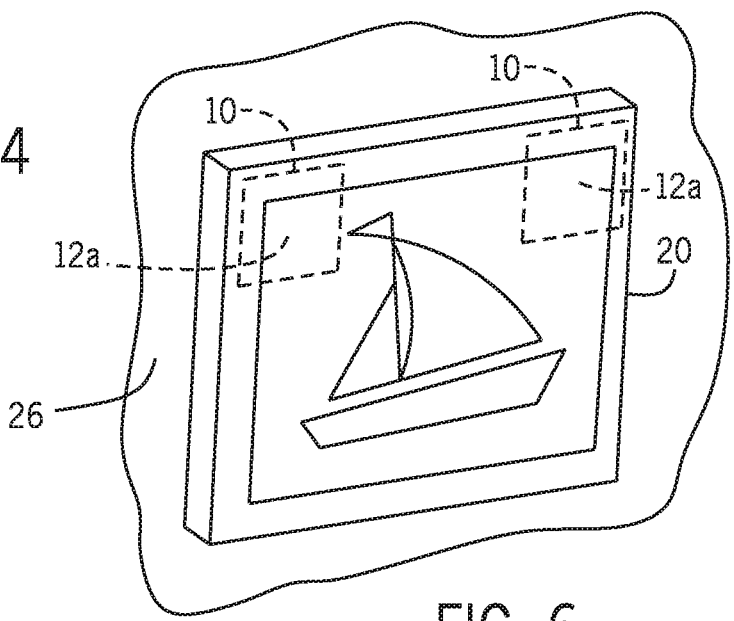
FIG. 6 is a front perspective view of an exemplary embodiment of the present invention, shown in use

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a wall hanging device for marking the location of wall mounting fasteners. The wall hanging device intrinsically locates connection points along a wall that correspond with connection points along an article to be hung on the wall. The systemic device provides two opposing surfaces, each surface providing corresponding guide markings. Each surface also has adhesive elements so that the device can first be adhered to the article and then transferred to the wall by way of urging the article against the wall, thereby ensuring that one or more preselected connection points along the article, first associated with one surface's guide marking(s), are intrinsically located on the wall by way of the other surface's corresponding guide markings after pulling away the article, leaving the temporarily adhered device to the wall. The device also provides a foldable pocket for capturing debris resulting from the installation of the mounting fasteners.

Referring to FIGS. 1 through 9, the present invention may include a wall hanging system embodying a systemic positioning and collection device 10 or 30 providing a wall-facing adhesive 22, an article-facing adhesive 14, guide markings 24a and 24b, a body 12, and a debris pouch 18, for precisely locating wall connections points along a hanging surface 26 that correspond to article connection points along a wall hanging 20 to be hung on the hanging surface 26.

The body 12 of the systemic device 10 and 30 may be made from heavy paper stock or other material sufficient to function in accordance with the present invention as described herein. Likewise, the body 12 may be square or any shape as long as it is generally planar to facilitate the functionality described herein, by providing an article-facing surface 12a and an opposing wall-facing surface 12b. Directional indicia 16a and 16b may be printed on the article-facing and wall-facing surfaces 12a and 12b, respectively, to facilitate the correct positioning and directionality of the systemic device 10 and 30 by indicating which side should face the hanging surface 26 and which side should face the predetermined article 20.

The wall-facing adhesive 22 may be disposed along a portion of the wall-facing surface 12b, typically but not limited to an upper portion thereof, for removably securing the device 10 or 30 temporarily on the desired hanging surface 26. The wall-facing adhesive 22 may be so disposed adjacent to and offset from one or more wall guide markers 24b. Each wall guide marker 24b may locate a connection point along the hanging surface 26, whereat fasteners may be mounted to the hanging surface 26 for hanging the article 20. Each wall guide marker 24b may be represented by indicia, such as shapes and/or numbers that locate the wall connection points, which correspond to the article guide markers 24a.

The opposing article-facing adhesive 14 may be disposed along the article-facing surface 12a for removably securing the device 10 or 30 at a desired location on the hanging surface 26. Each adhesive 14 and 22 provides adhesive elements 14a and 22a, respectively, for removably attaching to surfaces (the article 20 and the hanging surface 26, respectively). The strength of the wall-facing adhesive 22a may be sufficiently stronger, either relatively or due to greater surface area of the associated element 14a/22a, or both, than 14a so that when the body 12 is sandwiched and operatively associated between the article 20 and the hanging surface 26, a user pulling on the article 20 will cause the article 20 to disengage from the systemic device 10 or 30 prior to the systemic device 10 or 30 disengaging from the hanging surface 26.

The article-facing surface 12a provides article guide markings 24a, which correspond with their respective wall guide markings 24b in size and location along the body 12b. Each guide marking 24a and 24b indicate the location of a connection point shared by the article 20 and the hanging surface 26. Note, that the article connection points may be associated with a fastener of the article 20, such as a bracket, a wire, or even a ledge from which the article 20 can hang when associated with the mounting fasteners connected to the hanging surface 26. Typically, the connection points would be adjacent to and just outward of the periphery of the body 12 so that the body 12 and the connection points do not interfere with each other.

A debris pouch 18 may be disposed along a lower portion of the article-facing surface 12a for collecting falling debris during the fastener-mounting process at the wall connection points adjacent to the guide markers 24. The debris pouch 18 may include fold lines 19 to facilitate moving between a collecting condition and a storage condition.

It should be understood by those skilled in the art that the use of directional terms such as upper, lower, and the like are used in relation to the illustrative embodiments as they are depicted in the figures, the upper direction being toward the top of the corresponding figures and a lower direction being toward the bottom of the corresponding figures.

Figure 7:
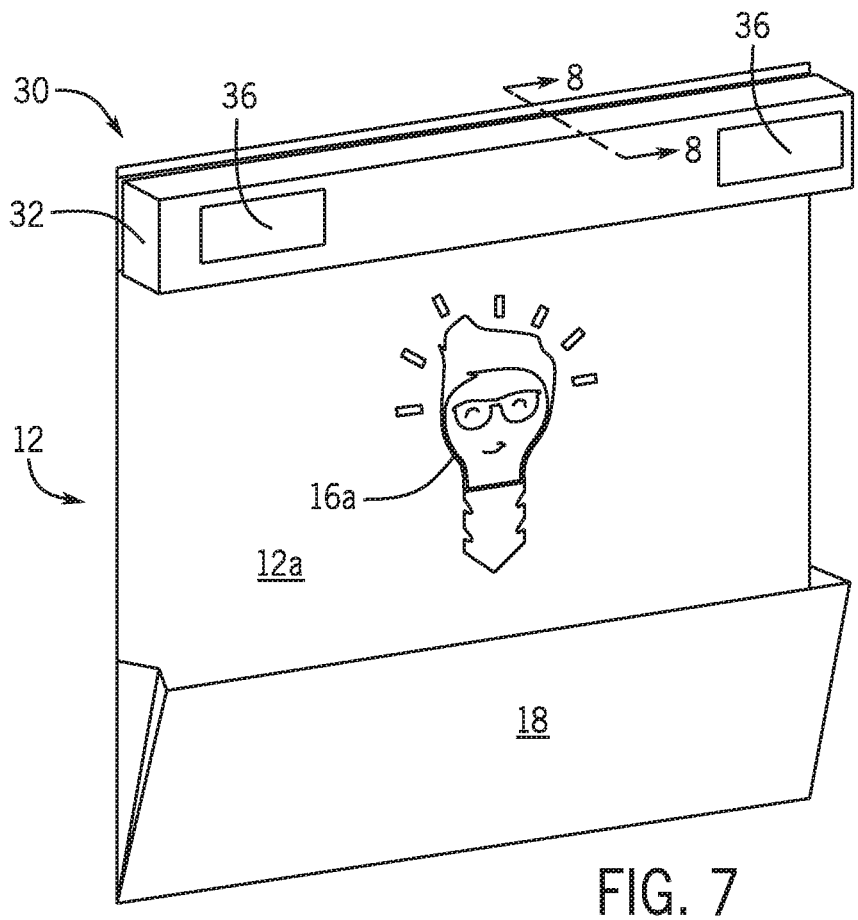
FIG. 7 is a front perspective view of an exemplary embodiment of the present invention.
Figure 8:
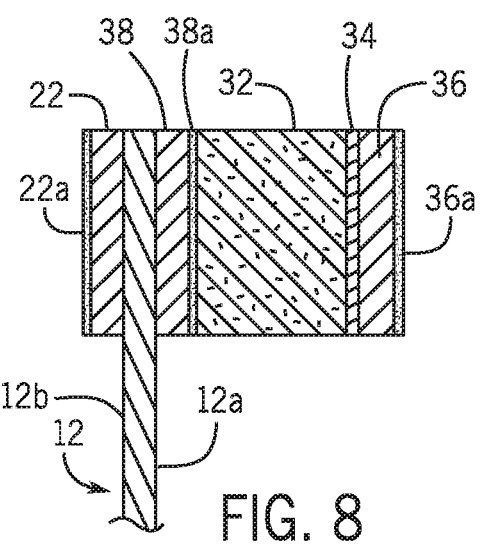
FIG. 8 is a cross-sectional view of an exemplary embodiment of the present invention, taken along line 8-8 of FIG. 7.

Referring now to FIGS. 7 and 8, the present invention may include a second embodiment of systemic device 30 with an additional spacing element comprised of a flexible material 32 and a rigid material 34 temporarily added to the art-facing side of the device body 12. For articles or artwork 20 with raised, protruding hanging hardware or for uneven wall-facing surfaces, this optional repositionable and removable spacing element 32/34 can be added to the positioning process. The spacing elements 32/34 may include flexible materials (e.g., foam 32 and cardboard 34) that are sandwiched between two adhesive elements 38a and 36a of respective repositionable tape 38 and 36. In certain embodiments, on one side of the repositionable tape 38, the adhesive element 38a is covering the entire length of the spacing element 32/34 and on the other side are two smaller, spaced apart art-facing tape elements 36a for the same sequential disengagement reasons stated above.

A method of making the present invention may include heavy paper stock and other individual components having double-sided repositionable adhesive tape 14, 22, 36 and 38, as well as a printing facility to print the drill positioning guide markings 24 and the direction markers 16a and 16b. A die-cutting and folding facility may be employed. Once all components are procured, the drill positioning markings 24 and the direction markers 16a and 16b may be printed on the paper stock (body 12). A die-cutting machine is then used to cut individual devices from the larger paper stock. A scoring machine or manual labor can be used to create the correct folds 19 in the individually cut pieces to allow for the creation of the debris pouch 18. A folding machine or manual labor can be used to fold the individual devices into the final assembly shape. Adhesive may be used to secure the debris pouch 18 flaps to the body 12. A machine or manual labor can be used to apply the double-sided repositionable adhesive tape elements 14, 22, 36, and 38 as well as the protective backing to the device that may constitute both the wall-facing adhesive strips 22a and the article-facing adhesive strips 14a/36a. During this manufacturing process, other components including a water-level or additional drill or positioning markings may be added to the present invention.

Figure 9:
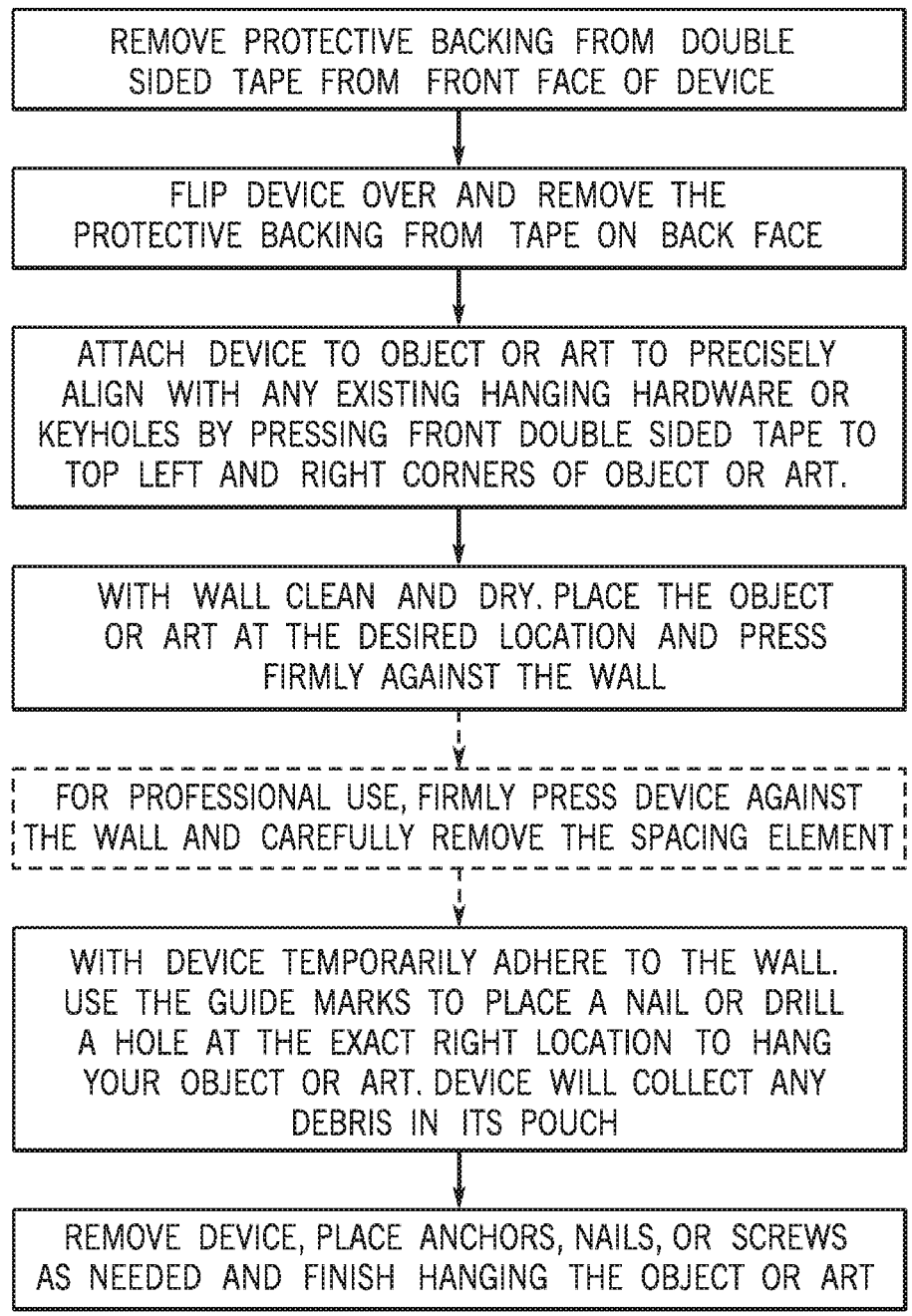
FIG. 9 is a flow chart of an exemplary embodiment of a completed loop of the present invention, shown in use.

Referring now to FIG. 9, a method of using the present invention may include the following as illustrated in flowchart 40. The systemic devices 10 and 30 disclosed above may be provided. A user may expose the article-facing adhesive element 14a so as to attach to the predetermined article 20 (item or frame) to be hung to a hanging surface 26, while maintaining alignment with any existing hanging infrastructure like nail holes, notches, etc. (i.e. article connection points) along said article 20. The wall-facing adhesive strip 22a may then exposed and the predetermined article 20 may be pressed against the hanging surface 26 at a selected location and orientation the user wants the article to hang, thereby transferring the systemic device 10 or 30 from the predetermined article 20 to the hanging surface 26 at said selected location and orientation. After the user pulls away the article 20, leaving the device 10 or 30 temporarily adhered to the selected location, the user can now identify the wall connection points on the hanging surface 26 that correspond with the article connections points. Then the user mounts fasteners at said wall connection points, e.g., through hammering nails, drilling holes, or screwing screws. Any drill debris is collected in the debris pouch 18 in the collecting condition. Upon completion of the drilling process, the systemic device 10/30 may be removed from the hanging surface 26.

For the second embodiment, a user may expose the article-facing adhesive element 36a so as to attach to the predetermined article 20 (item or frame) to be hung to a hanging surface 26, while maintaining alignment with any existing hanging infrastructure like nail holes, notches, etc. (i.e. article connection points) along said article 20. Then the user may subsequently expose the wall facing adhesive 22a to temporarily affix the device 30 to the hanging surface 26 at the desired location, as described above. Upon positioning of the device 30, and after the article 20 has been pulled away from the device 30, the spacing element(s) 32/34 may be removed from the device 30 and mounting the fasteners can commence similarly to above.

Thereby, the present invention facilitates easy positioning of the article 20 to be hung in relation to available vertical space 26 and the temporary marking of that position. It also allows for exact placement of bore holes in precise alignment with available hanging infrastructure of the article 20 to be hung (nail holes, latches, notches, wires, etc.), and maintaining the originally intended alignment to said article 20, intuitively reflecting the dimensionality of the article 20 to be hung without requiring measurements of any kind.

It should be understood, of course, that the foregoing relates to exemplary embodiments of the invention and that modifications may be made without departing from the spirit and scope of the present invention.

What is claimed is:

1. A wall hanging device, comprising:
   a planar body having a first surface and an opposing second surface;
   at least one first guide marking disposed along the first surface;
   a second guide marking for each first guide marking, each second guide marking disposed along the second surface so as to correspond with each first guide marking, respectively;
   a first adhesive element provided along the first surface adjacent to said at least one first guide marking;
   a second adhesive element provided along the second surface adjacent to said at least one second guide marking; and
   a debris pouch along a lower portion of the first surface.

2. The wall hanging device of claim 1, wherein the second adhesive element provides greater adhesive than the first adhesive element.

3. The wall hanging device of claim 1, further comprising at least one fold line along the debris pouch for moving between a collecting condition and a storage condition.

4. The wall hanging device of claim 1, further comprising a spacing element between the first surface and the first adhesive element.

5. A wall hanging device, comprising:
   a planar body having a first surface and an opposing second surface;
   at least one first guide marking disposed along the first surface;
   a second guide marking for each first guide marking, each second guide marking disposed along the second surface so as to correspond with each first guide marking, respectively;
   a first adhesive element provided along the first surface adjacent to said at least one first guide marking;
   a second adhesive element provided along the second surface adjacent to said at least one second guide marking; and
   a debris pouch along a lower portion of the first surface, wherein the debris pouch is movable between a collecting condition and a storage condition collapsed against the first surface.

6. The wall hanging device of claim 5, wherein the second adhesive element provides greater adhesive than the first adhesive element.

7. The wall hanging device of claim 5, further comprising a spacing element attached along the first adhesive element; the spacing element providing a spacing adhesive.

8. The wall hanging device of claim 5, wherein the debris pouch is upward-facing in the collecting condition.

\* \* \* \* \*